US012767331B2

(12) United States Patent
Sarigul-Klijn et al.

(10) Patent No.: US 12,767,331 B2
(45) Date of Patent: Oct. 20, 2026

(54) SKIDBOARD FOR CRUISE MISSILE AIR DROP

(71) Applicant: Logistic Gliders Inc., Dixon, CA (US)

(72) Inventors: Martinus M. Sarigul-Klijn, Dixon, CA (US); Nesrin Sarigul-Klijn, Dixon, CA (US)

(73) Assignee: Logistic Gliders Inc., Dixon, CA (US)

( * ) Notice: Subject to any disclaimer, the term of this patent is extended or adjusted under 35 U.S.C. 154(b) by 0 days.

(21) Appl. No.: 19/371,805

(22) Filed: Oct. 28, 2025

(65) Prior Publication Data

US 2026/0167332 A1 Jun. 18, 2026

Related U.S. Application Data

(62) Division of application No. 19/067,392, filed on Feb. 28, 2025, now Pat. No. 12,617,529.

(60) Provisional application No. 63/673,047, filed on Jul. 18, 2024.

(51) Int. Cl.

| | |
|---|---|
| ***B64D 1/10*** | (2006.01) |
| ***B64C 1/14*** | (2006.01) |
| ***B64C 1/20*** | (2006.01) |
| ***B64D 1/08*** | (2006.01) |

(52) U.S. Cl.

CPC ................ *B64D 1/10* (2013.01); *B64D 1/08* (2013.01); *B64C 1/1415* (2013.01); *B64C 1/20* (2013.01)

(58) Field of Classification Search

USPC ....................................... 89/1.58, 1.59, 1.54

See application file for complete search history.

(56) References Cited

U.S. PATENT DOCUMENTS

| | | | |
|---|---|---|---|
| 4,161,301 | A | 7/1979 | Beardsely et al. |
| 4,256,012 | A | 3/1981 | Cowart et al. |
| 5,763,811 | A | 6/1998 | Ruzicka |
| 6,347,567 | B1 | 2/2002 | Eckstein |
| 8,371,535 | B2 | 2/2013 | Grabmeier et al. |
| 8,387,920 | B2 | 3/2013 | Grabmeier |
| 8,979,029 | B2 | 3/2015 | Jaurand et al. |
| 8,985,519 | B2 | 3/2015 | Jaurand |
| 10,040,549 | B2 | 8/2018 | Sarigul-Klijn et al. |

(Continued)

OTHER PUBLICATIONS

EP 1806287 A2 (Patent publication & English Translation) (Year: 2007).*

(Continued)

*Primary Examiner* — Reginald S Tillman, Jr.

(74) *Attorney, Agent, or Firm* — Stiennon & Stiennon

(57) ABSTRACT

An airdrop skidboard for a cruise missile or bomb has an elongated platform. A crushable member is fixed to the platform. Two lateral restraints extend upwardly from the platform spaced in a cross direction perpendicular to the flight direction. The lateral restraints restrain lateral displacement of a missile disposed on the crushable member. A nose ballast is fixed to the first end of the elongated platform such that the center of gravity of the skidboard is closer to the first than the second end. A spring opening in the crushable member between a midpoint of the elongated platform and the first end receives a spring disposed to apply an upward force on an overlying missile, such that when a cruise missile on the skidboard is launched from an aircraft, the spring separates the skidboard from the missile, permitting the skidboard to fall away.

5 Claims, 7 Drawing Sheets

(56) References Cited

U.S. PATENT DOCUMENTS

| | | | |
|---|---|---|---|
| 11,143,489 B2 | 10/2021 | Campbell et al. | |
| 2012/0251280 A1 | 10/2012 | Jaurand et al. | |
| 2026/0015127 A1 * | 1/2026 | Allaei | B63B 35/00 |

OTHER PUBLICATIONS

RU 2712403 C1 (Patent publication & English Translation) (Year: 2020).*

Air Force Research Laboratory (AFRL), "Rapid Dragon", chrome-extension://efaidnbmnnnibpcajpcglclefindmkaj/https://afresearchlab.com/wp-content/uploads/2021/09/AFRL_Rapid-Dragon_FS_240328.pdf, downloaded Feb. 28, 2025.

* cited by examiner

SKIDBOARD FOR CRUISE MISSILE AIR DROP

CROSS REFERENCES TO RELATED APPLICATIONS

This application is a divisional of U.S. application Ser. No. 19/067,392, filed Feb. 28, 2025, which application claims the benefit of priority of U.S. App. No. 63/673,047, filed Jul. 18, 2024, the disclosure of which is incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to air dropping of payloads from cargo aircraft.

Cargo aircraft transport material and supplies to airports and landing strips around the world. Yet many remote locations do not have the necessary facilities to receive large aircraft such as the C-130 or C-17. Supplies can be delivered for disaster relief, support of exploratory and scientific missions and for reconnaissance teams by air drop from a cargo aircraft. Moreover, in military conflicts shipments must be made to areas which may not be sufficiently controlled to allow aircraft landings. In some cases, self-guided gliders or cruise missiles may be launched from a cargo aircraft. For example, the Lockheed Martin Rapid Dragon palletized airdrop standoff missile system employs an array of cruise missiles packaged within a palletized frame which is received within a C-130 cargo compartment. To deploy the missiles, the aft cargo door of the aircraft is opened, and the entire frame is ejected from the aircraft. Parachutes extract the individual cruise missiles from the ejected and falling frame, after which the individual missiles are activated. Although expeditious and effective, this approach requires all the payloads within a frame to be launched at the same location. Moreover, should a problem arise in the launch, all the cruise missiles could be lost. In addition, the one-time use frame is not recoverable, and poses a hazard to inhabitants below the launch site.

What is needed is an airlaunch arrangement which is compatible with existing aircraft, which allows the individual launch of subpayloads and which is reusable.

SUMMARY OF THE INVENTION

An air drop rack assembly has a rack frame with two parts: a front part mounted to the load deck of a cargo aircraft's cargo compartment and an aft part mounted to the aircraft cargo ramp. The rack parts have rollers in conveyor assemblies mounted between C-channels which engage skidboards which support smaller aircraft such as gliders or cruise missiles. When the cargo ramp is raised and the aft opening of the cargo compartment is closed, the aft part of the rack tilted up with respect to the forward part. When a payload is to be dropped at the launch site, the cargo ramp is deployed to bring the two rack frame parts into parallel alignment, thus presenting a substantially continuous launch channel defined between C-channels above conveyor roller assemblies. Although the aligned rack parts are spaced apart, when the cargo aircraft is tilted upwardly, the individual payloads on skidboards are guided within the launch channels and discharged out the aircraft aft opening. The skidboard may be attached to the payload, or the payload may be carried on a separable skidboard. Cruise missiles may be supported on a skidboard with a crushable deformable surface. This skidboard has a forward ballast weight and an intermediate spring which urges the cruise missile away from the skidboard. Once launched, the spring separates the skidboard and the ballast weight causes the released skidboard to drop vertically, allowing for unencumbered separation of the skidboard from the payload, and preventing lateral fight of the skidboard.

It is an object of the present invention to provide an air drop rack assembly capable of supporting multiple aircraft within the cargo compartment of a cargo aircraft for individualized release.

It is another object of the present invention to provide an air drop rack assembly for multiple aircraft which is retained within a cargo aircraft's cargo compartment during launch and which is fully reusable.

It is a further object of the present invention to provide a system for launching multiple drones or payloads which does not discharge disposables at the launch site.

It is an additional object of the present invention to provide an air drop frame which allows dropped payloads such as drones, cruise missiles or bombs to be launched one at a time.

Further objects, features and advantages of the invention will be apparent from the following detailed description when taken in conjunction with the accompanying drawings.

DESCRIPTION OF THE PREFERRED EMBODIMENTS

Figures 1, 2, 3, 4:
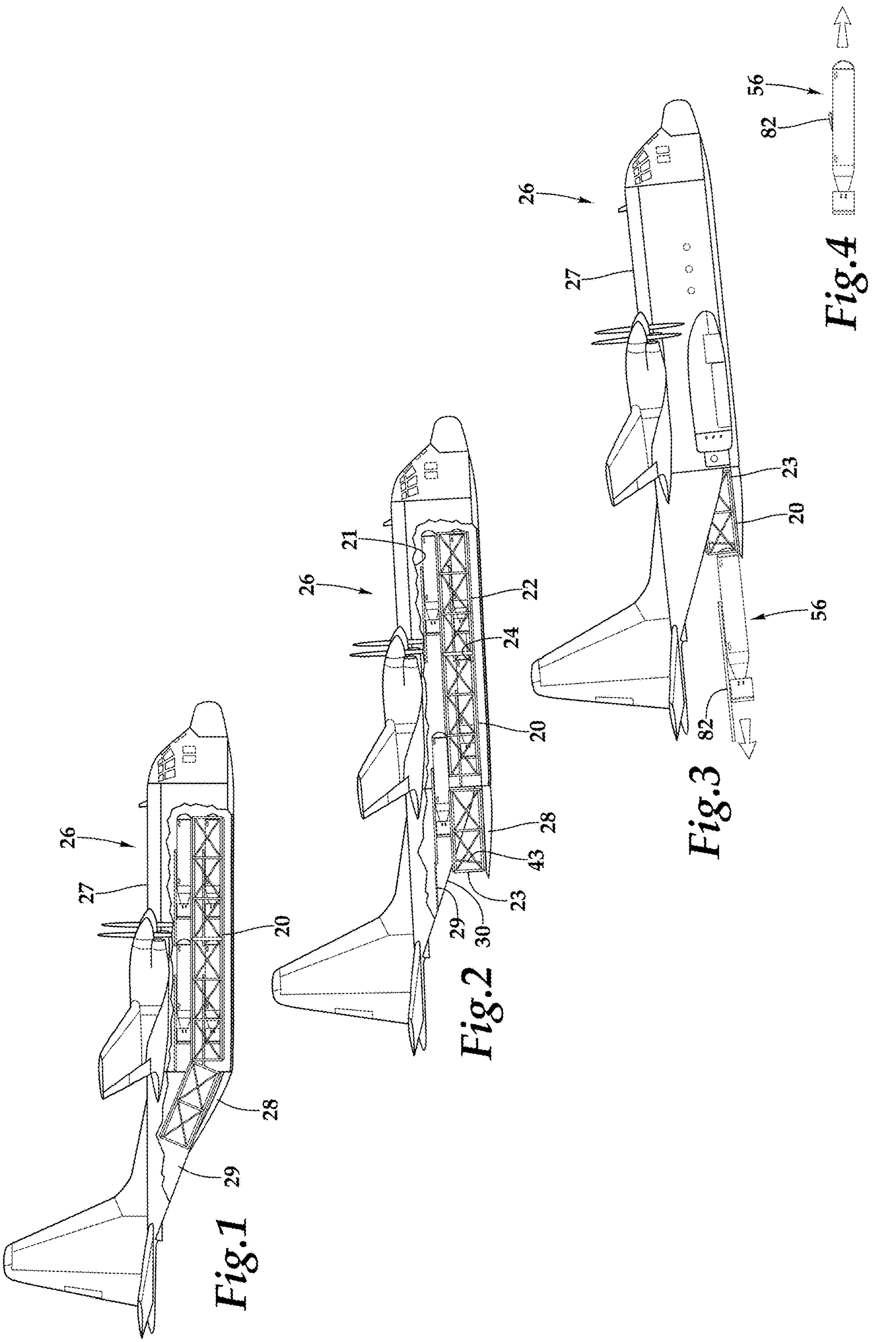
FIG. 1 is a schematic view of a cargo aircraft with the air drop deployment structure of this invention in a transport configuration.
FIG. 2 is a schematic view of the cargo aircraft of FIG. 1 inclined upwardly at a positive angle of attack with the loading ramp opened to bring the air drop deployment structure into a drop configuration.
FIG. 3 is a schematic view of a drone being dropped from the aircraft.
FIG. 4 is a schematic view of the drone of FIG. 3 in flight.

Referring more particularly to FIGS. 1-15, wherein like numbers refer to similar parts, an airdrop rack assembly 20 is mounted within the interior cargo compartment 21 of a cargo aircraft 26 such as a Lockheed C-130. As shown in FIG. 2, the cargo aircraft 26 cargo compartment 21 has a load deck 24 which extends aft to an aft opening 30. The aft opening 30 is closed by a pivoting cargo ramp 28, which is mounted by a hinge 25 at its forward end to the aircraft fuselage 27 leading to the load deck 24, and an aft cargo door 29 which is hinged at its aft end. For loading and unloading of the aircraft, the cargo ramp 28 is lowered on hydraulic struts 43 extending from the fuselage 27, and the aft cargo door 29 is raised above the cargo ramp to reveal the aft opening 30. The airdrop rack assembly 20 provides for the airdropping of multiple smaller aircraft such as cruise missiles 54, shown in FIG. 11, or compact gliders 56, shown in FIGS. 6-9.

Figure 6:
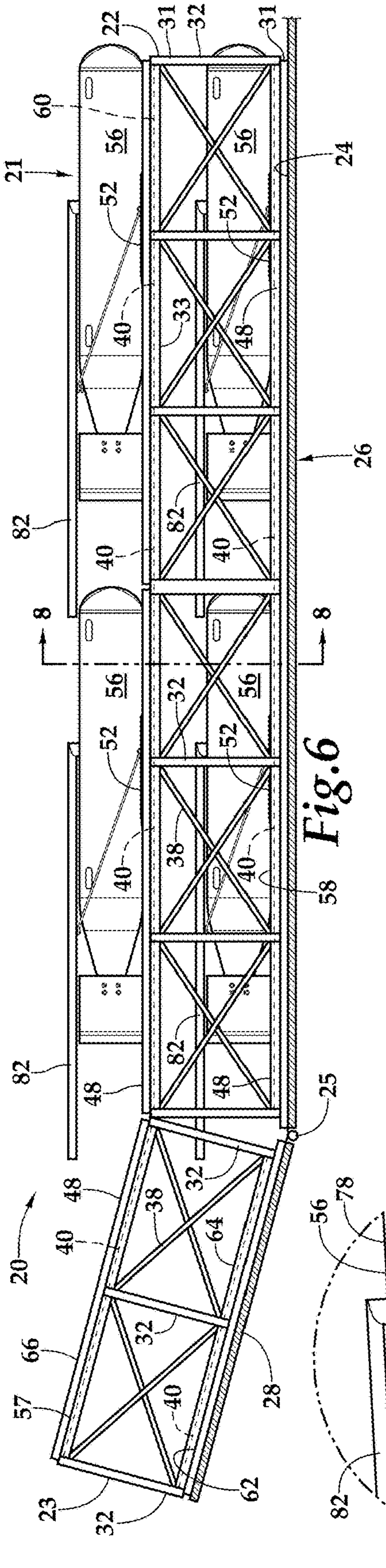
FIG. 6 is a side elevational view of the air drop deployment structure of this invention in a stowed configuration.

As shown in FIG. 6, the airdrop rack assembly 20 has two parts, a rack forward part 22 which is fixed to the load deck 24 and a rack aft part 23 which is fixed to the cargo ramp 28. The rack aft part 23 is separate from the rack forward part 22 and is pivotable with respect to the rack forward part as the cargo ramp 28 is lowered. Thus, when the cargo ramp 28 is raised during transport, the rack aft part is inclined with respect to the rack forward part 22.

Figure 5:
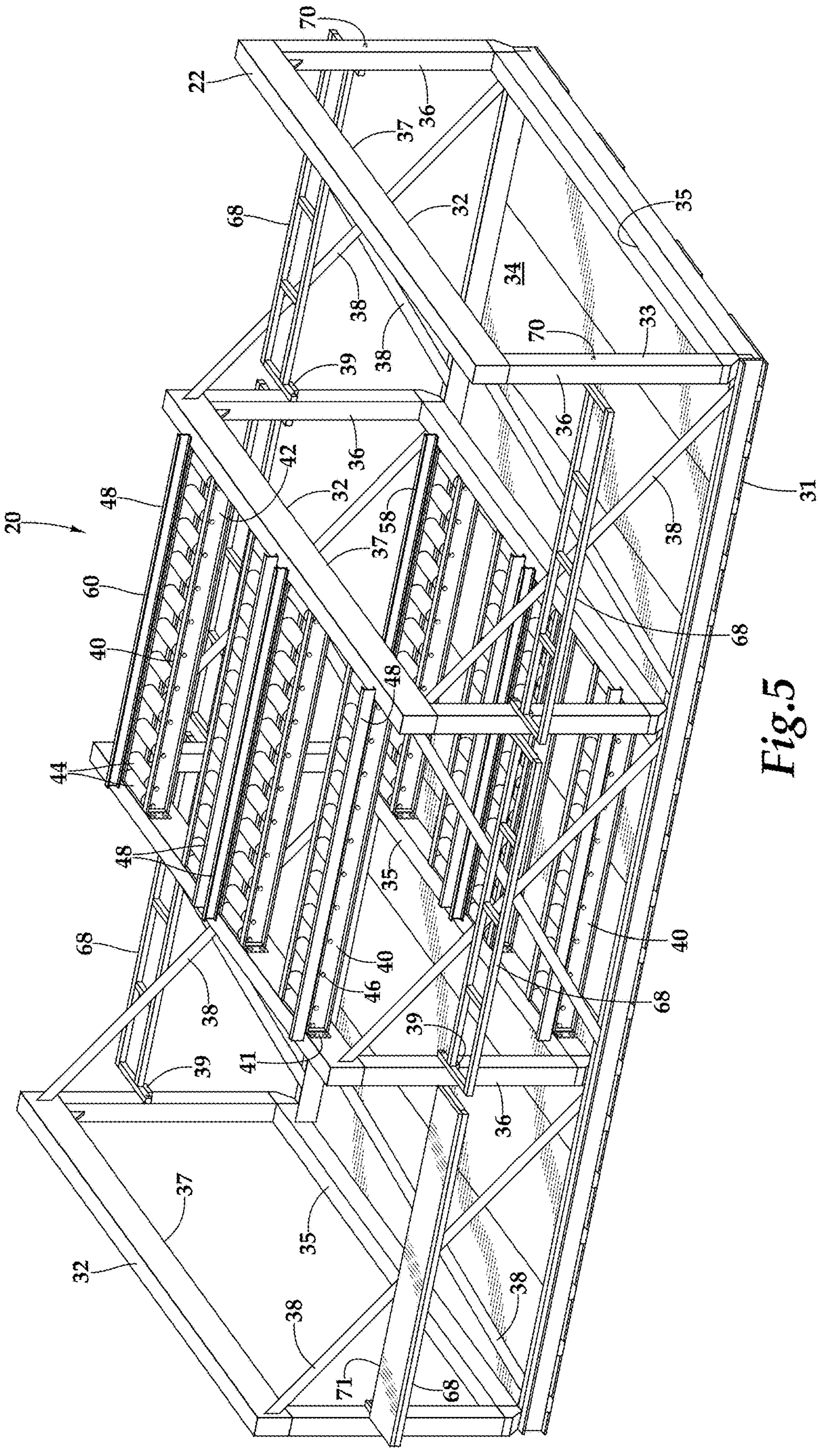
FIG. 5 is an isometric view of the air drop deployment structure of FIG. 2 in a partially assembled configuration.
Figure 8:
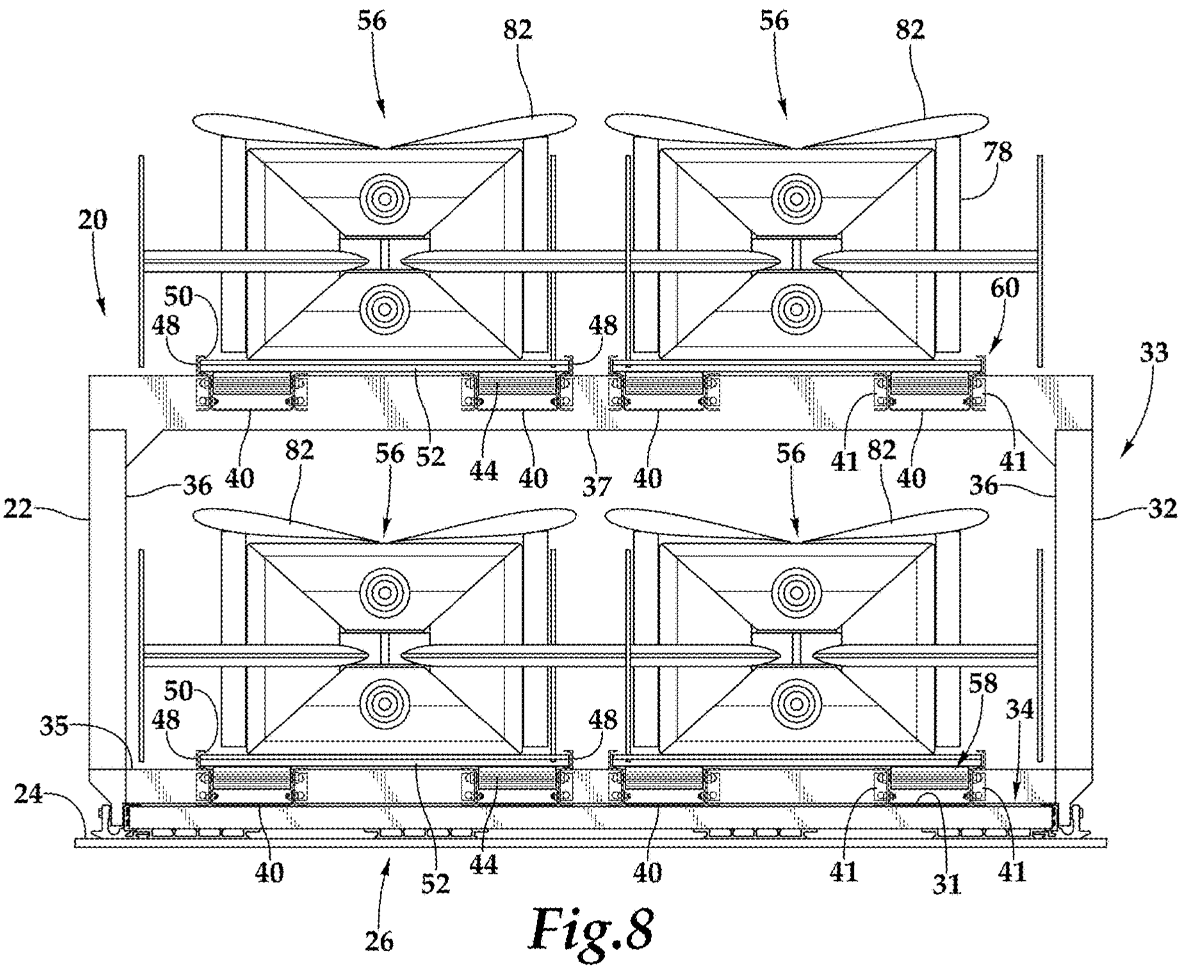
FIG. 8 is a cross-sectional view of the air drop deployment structure of FIG. 6 taken along section line 8-8, showing the rear elevational view of the air drop deployment structure with four gliders supported thereon.
Figure 9:
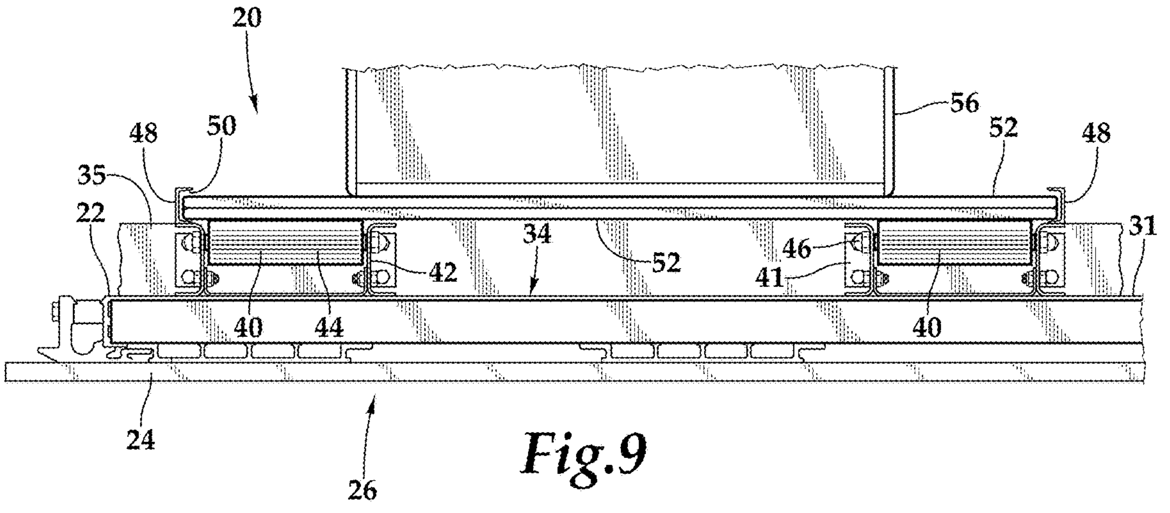
FIG. 9 is an enlarged fragmentary cross-sectional view of a drone with its support board engaged between C-channels of the air drop deployment structure of FIG. 8.

The construction of a portion of the rack forward part 22 is shown in FIG. 5. A forward platform 31 is comprised of two conventional 16-foot long Type V airdrop platforms, each of which is 108 inches wide and $3^{11}/_{16}$ inches thick. The forward platform 31 overlies and is secured to the load deck 24 within the cargo compartment 21 of the aircraft 26. A rectangular frame 33 is made up of multiple parallel rectangular frame elements 32. Each frame element 32 is formed of steel rectangular tubing, and the frame elements are regularly spaced in a flight direction along the forward platform. Each rectangular frame element 32 has a lower horizontal member 35 which extends across the top surface 34 and is fixed to the forward platform 31. Each lower horizontal member 35 is connected to two vertical members 36 which support an upper horizontal member 37 above the lower horizontal member. Crossed tension members 38 such as belts or chains extend between and brace the rectangular frames 32, proving forward and aft restraint. Conventional off-the-shelf conveyor roller assemblies 40 are bolted between the spaced lower horizontal members 35 and other roller assemblies 40 are bolted between the upper horizontal members 37. The roller assemblies have attachment flanges 41, as shown in FIGS. 5 and 8, by which they are mounted to the vertical faces of the upper horizontal frame members 37. Each roller assembly 40 has two parallel side members 42 which receive parallel axles 46 which support cylindrical rollers 44. As shown in FIGS. 8 and 9, C-channels 48 are fixed to the roller assemblies 40 by welding to the side members 42. A C-channel 48 on an outside and an inside C-channel define a flight direction restraining channel 50 which engages the skidboard 52 of an airdropped cruise missile 54 or glider 56 and provides lateral and vertical restraint for the airdropped vehicle as it advances along the restraining channel 50. As shown in FIG. 8, two of these restraining channels 50 are defined on each level of the frame, an enlarged view of one of the two restraining channels is shown in FIG. 9. In the side views of FIGS. 6-7, the location of the roller assemblies are indicated schematically by broken lines.

The roller assemblies 40 mounted between the lower horizontal members 35 of the rack forward part 22 define a lower rack shelf 58. The roller assemblies 40 mounted between the upper horizontal members 37 of the rack forward part 22 define an upper rack shelf 60 spaced above the forward platform 31. The upper conveyor roller assemblies 40 are parallel to the lower conveyor roller assemblies and facilitate movement of the cargo supported on the shelves 60 in the flight direction.

Figure 7A:
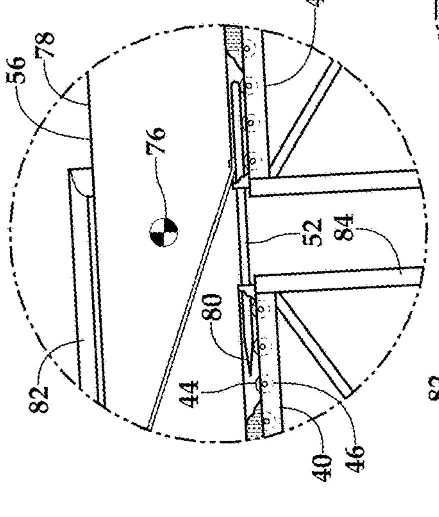
FIG. 7A is an enlarged fragmentary view of the air drop deployment structure of FIG. 7 taken at detail 7A-7A, showing the glider supported thereon and passing across the gap between the rack forward part upper shelf and the aft forward part upper shelf.
Figure 7:
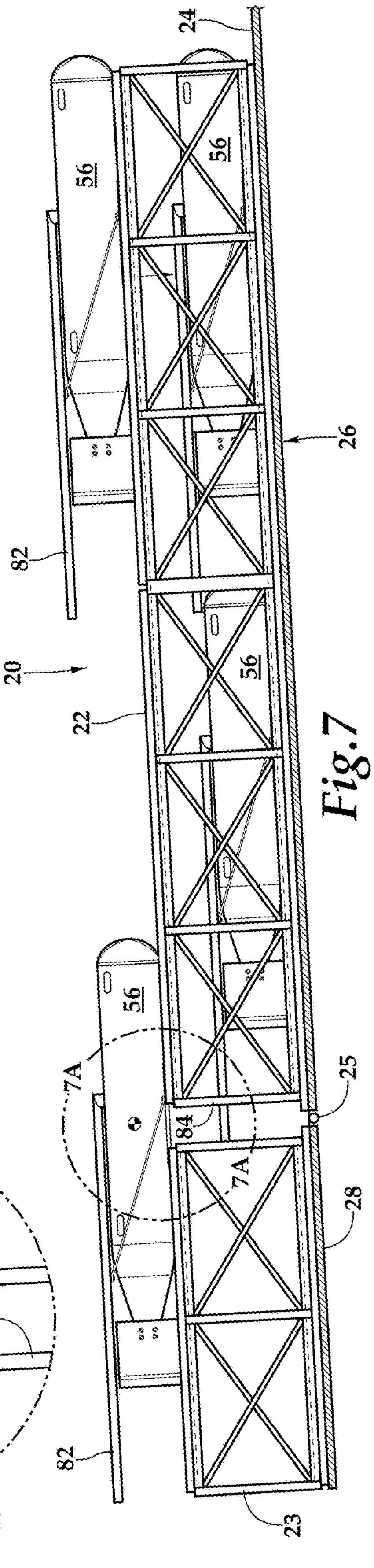
FIG. 7 is a side elevational view of the air drop deployment structure of FIG. 6 in a drop configuration.

As shown in FIGS. 6 and 7, the airdrop cargo assembly rack aft part 23 is of similar construction to the rack forward part 22, but is shorter in the flight direction. The rack aft part 23 has an aft platform 62 with an aft frame 57 made up of three parallel rectangular frame elements 32 spaced from one another in the flight direction and having bracing tension members 38. The aft platform 62 is secured to the cargo ramp 28 and thus pivots with the cargo ramp when it is raised and lowered by the hydraulic struts 43. The cargo ramp 28 pivots about a hinge 25 which connects the cargo ramp to the aircraft fuselage 27. Conveyor roller assemblies 40 are fixed to the aft platform 62 to define an aft lower rack shelf 64. Upper conveyor roller assemblies 40 are fixed to the frames 32 to define an aft upper rack shelf 66 which is parallel to and above the aft lower rack shelf 64. The spacing between the upper and lower rack shelves of the rack aft part 23 and the spacing between the upper and lower rack shelves of the rack forward part 22 are the same. Thus when the cargo ramp 28 is lowered as shown in FIG. 2, the lower rack shelf 64 of the aft platform 62 defined by the conveyor roller assemblies are brought parallel to and aligned with the lower rack shelf 58 defined by the forward platform 31 conveyor roller assemblies and the aft platform upper rack shelf 66 defined by conveyor roller assemblies is parallel to and aligned with the forward platform upper rack shelf defined by the conveyor roller assemblies. As shown in FIG. 7, in the lowered configuration the rack aft part 23 is spaced in the flight direction from the rack forward part 22 and does not directly engage the rack forward part 22. As discussed below, when the aft rack part is in the lowered configuration, the airdrop rack assembly 20 permits the deployment of cargo through the aircraft aft opening 30.

In FIG. 5 is shown a partially assembled rack forward part 22, which is provided with folding horizontal platforms or catwalks 68 which may be constructed of square steel tubing. The catwalks 68 are connected by pins 70 to the vertical members 36 of the rectangular frame elements 32. The pins 70 extend through holes in the vertical members 36 or ears with holes fixed to the vertical members, and may be pivoted 90 degrees upward to a collapsed configuration. Stop blocks 39 fixed to the vertical members 36 retain the catwalks in a horizontal orientation when deployed. When extended the vertical members 36 or the catwalks are provided with stops to prevent the catwalks from collapsing downwardly. The catwalks 68 may be overlain with plywood or expanded metal grid surface elements 71. For clarity, the catwalks have been omitted in the other views.

The catwalks 68 allow service personnel to readily access the aircraft supported on the front rack part upper shelf 60. A portable stepstool or ladder (not shown) may be utilized by personnel to reach the catwalks 68.

Figure 11:
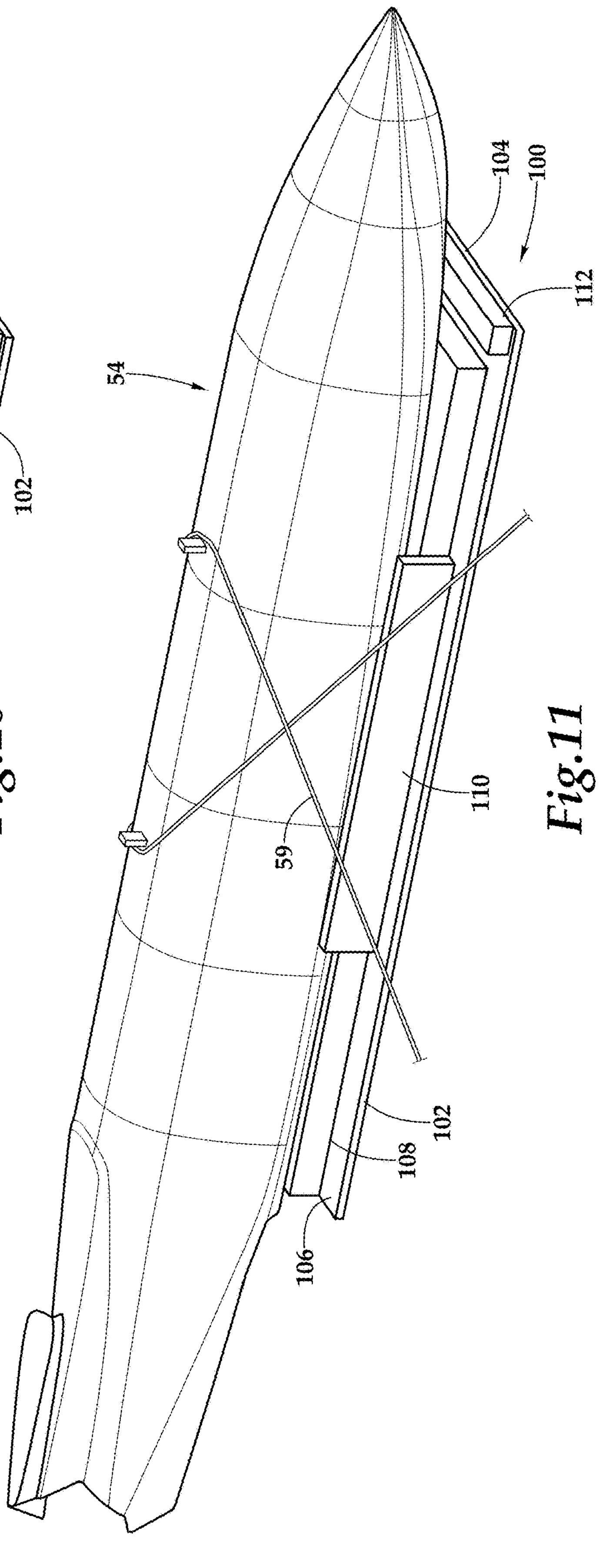
FIG. 11 is an isometric view of a cruise missile mounted on the support board of FIG. 10, with the cruise missile and support board lashed in place within the cargo aircraft.
Figure 12:
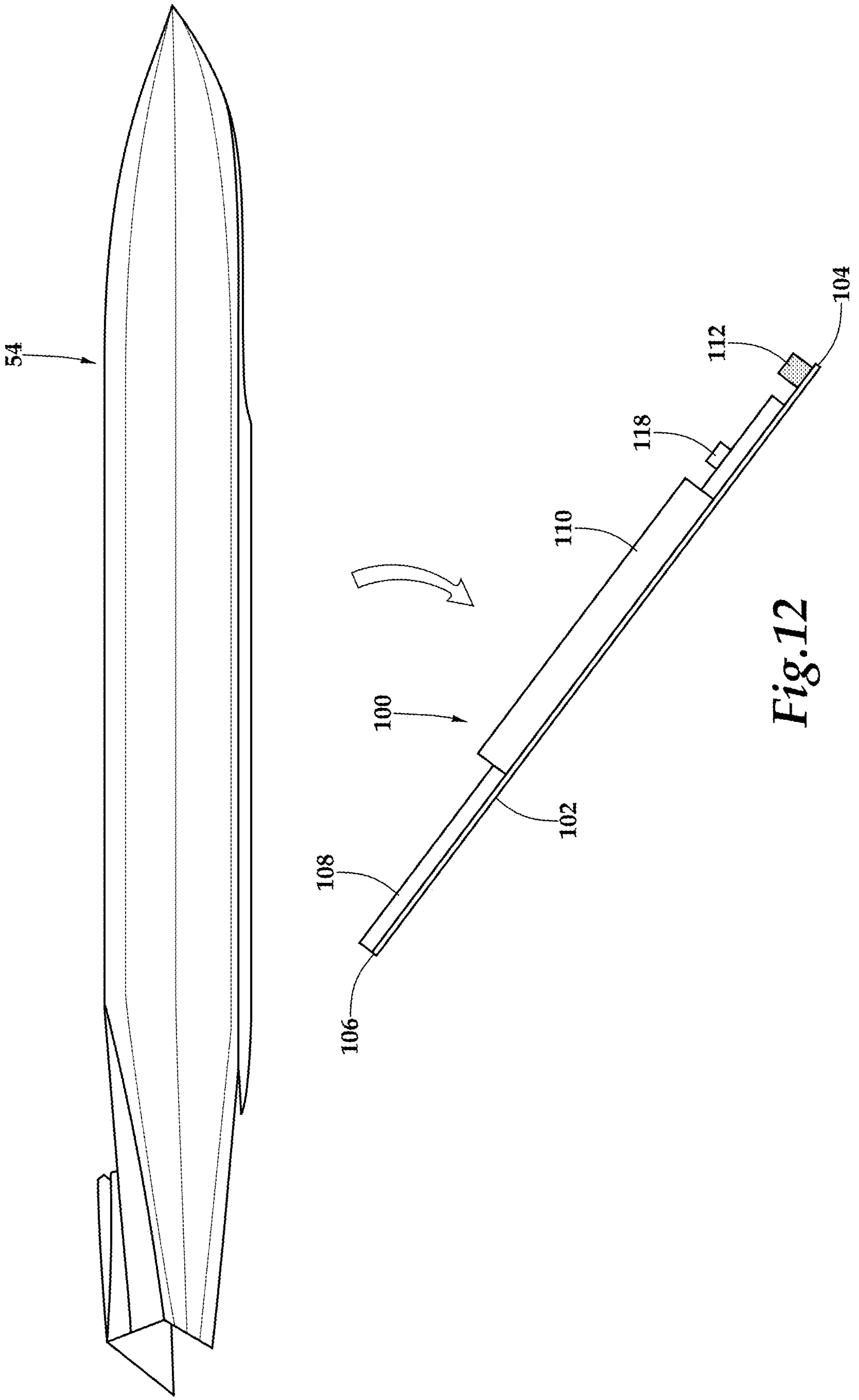
FIG. 12 is a side elevational view of the dropped cruise missile of FIG. 11 separating from its support board.

The airdrop rack assembly 20 may be used to deploy a variety of vehicles including cruise missiles 54, shown in FIGS. 11 and 12, unpowered gliders 56, and jet augmented gliders (not shown). As shown in FIG. 6, the vehicles, for example the gliders 56, are carried on the forward upper and lower rack shelves 60, 58 of the airdrop rack assembly 20. Until launch, no vehicles occupy the shelves 64, 66 of the rack aft part 23. Each glider 56 has a rectangular skidboard 52 fixed beneath it to underlie the center of gravity 76 of the loaded glider, as shown in FIG. 7A. As shown in FIGS. 8 and 9, the skidboard 52 extends sidewardly on both sides of the glider fuselage 78. As shown in FIG. 7A, the aft margin 80 of the skidboard 52 may be tapered. As shown in FIG. 9, the skidboard 52 rests on the rollers 44 of the roller assemblies 40, and extends sidewardly to be engaged within the C-channels 48 on either side of two rows of roller assemblies which define the restraining channel 50. Each glider 56 is independently restrained on the rack, for example by various cables or ties (not shown). Thus restrained, the cargo aircraft 26 may travel to the launch site with the gliders 56 securely supported on the rack assembly 20. When the cargo aircraft 26 approaches the launch site, the cargo door 29 is retracted and the cargo ramp 28 is lowered, as shown in FIG. 2. The lowering of the cargo ramp 28 spaces the rack aft part 23 from the rack forward part 22 and brings the shelves of the rack parts into a parallel configuration. When the cargo aircraft 26 is at the launch site, the restraints on the glider 56 are released on the vehicle to be launched, and the nose of the cargo aircraft is pitched upwardly. With the cargo aircraft 26 inclined upwardly, the unconstrained glider 56 payload on the rack structure 20 is free to travel from the rack forward part 22 to the rack aft part 23 for discharge from the cargo aircraft through the aft opening 30 as shown in FIG. 3. The C-channels 48 constrain the skidboard 52 beneath the glider 56 and cause the glider to pass over the rack aft part 23 and leave the cargo aircraft 26. Once the glider 56 has exited the cargo aircraft, as shown in FIG. 4, the wings 82 of the glider are deployed, and the glider 56 proceeds to its destination independent of the cargo aircraft 26. As shown in FIG. 7A, the skidboard 52 has a dimension in the flight direction which is greater than the gap 84 between the rack forward part 22 and the rack aft part 23 when the cargo ramp 28 is in a lowered configuration. The tapered aft margin 80 of the skidboard 52 eases the engagement of the skidboard with the rollers 44 of the rack aft part. Moreover, because the center of gravity 76 of the glider is over the skidboard 52, the glider cannot tip into the gap 84.

The airdrop rack assembly 20 thus allows individual payloads to be dispensed from the cargo aircraft each at the desired launch site. In the case of the gliders 56 or other aircraft with a fixed skidboard, no ancillary loose structure is launched which might be a concern to persons below at the launch site. In addition, because no parachute is required to deploy the launched aircraft, only about 300 feet of altitude is used before the glider is underway. If multiple aircraft are to be deployed at a single launch site, they may readily be simultaneously released from restraint and discharged one after the other when the cargo aircraft is tipped at an angle of attack.

Figure 10:
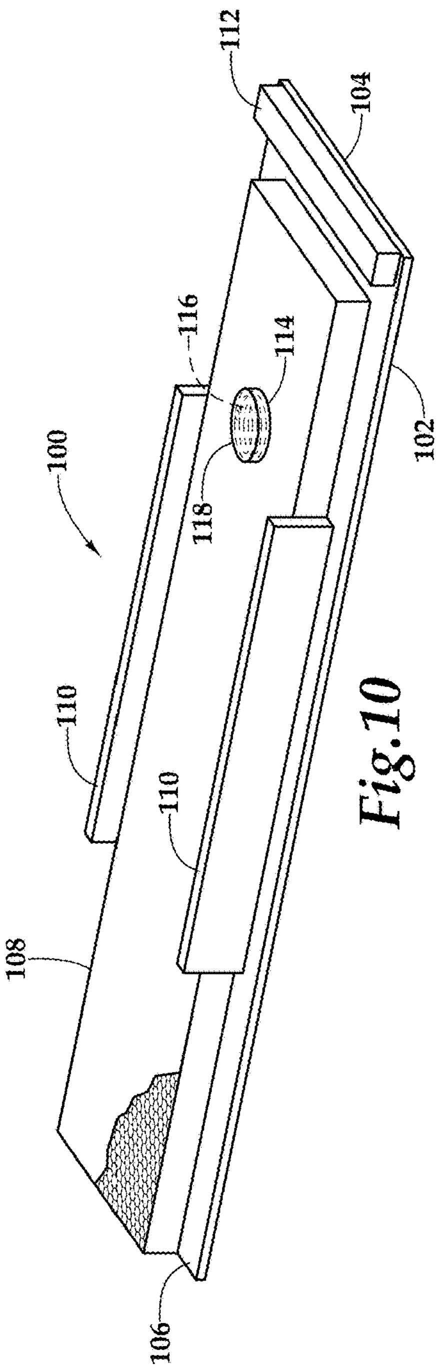
FIG. 10 is an isometric view of a support board for a cruise missile or bomb.

An alternative embodiment skidboard 100 is shown in FIGS. 10-12 for the launch from a cargo aircraft of a cruise missile 54 from an airdrop rack assembly similar to the assembly 20 described above, although, depending on the dimensions of the cruise missiles, the dimensions of the rack assembly may be set to accommodate more missiles on three levels instead of two. As shown in FIG. 11, each cruise missile 54 is supported on a skidboard 100. During transport, the cruise missile 54 is held in place on the rack and with respect to the skidboard 100 by restraints 59.

As shown in FIG. 10, the skidboard has an elongated platform 102 which extends in a flight direction from a first end 104 to a second end 106. The first end 104 is closer to the nose of the missile, while the second end 106 is closer to the tail of the missile. The elongated platform is made of a stiff material, for example one-inch thick plywood, and is longer in the flight direction than in the cross direction, for example 30 inches wide and 96 inches long in the flight direction.

A deformable or crushable member 108 overlies and is fixed to the elongated platform 102 such as by an adhesive. Portions of the crushable member 108 deform downwardly when a cruise missile is disposed thereon, conforming it to the shape of the cruise missile. The crushable member 108 may be a three-inch thick tall by 21 inch wide expandable honeycomb paper structure. A honeycomb paper structure has expanded paper interior defining hexagonal cells, with outer and inner planar paper layers glued to the expanded paper. The crushable member 108 may be selected to crush at about 40 psi, such that the gravity force applied to the crushable member by the cruise missile causes its deformation and engages the cruise missile on the skidboard 100.

Two lateral restraints 110 extend upwardly from the elongated platform 102 and are spaced from each other in a cross direction which is perpendicular to the flight direction. The lateral restraints 110 are positioned to restrain lateral displacement of a missile when it is disposed on the crushable member 108. The lateral restraints may be, for example, 2×6 dimensional lumber glued, nailed, screwed or otherwise fastened to the elongated platform 102. The lateral restraints 110 are positioned so the elongated platform extends in the cross direction sidewardly beyond each of the two lateral restraints to define flanges for engagement within the C-channels of the airdrop rack.

A nose ballast 112 is fixed to the first end 104 of the elongated platform 102 such that the center of gravity of the skidboard 100 is closer to the first end than to the second end 106 of the elongated platform. The nose ballast may be a strip of steel or cast iron weight at least ninety pounds. The nose ballast helps to aerodynamically stabilize the skidboard 100 after the skidboard 160 separates from the cruise missile.

Figure 13:
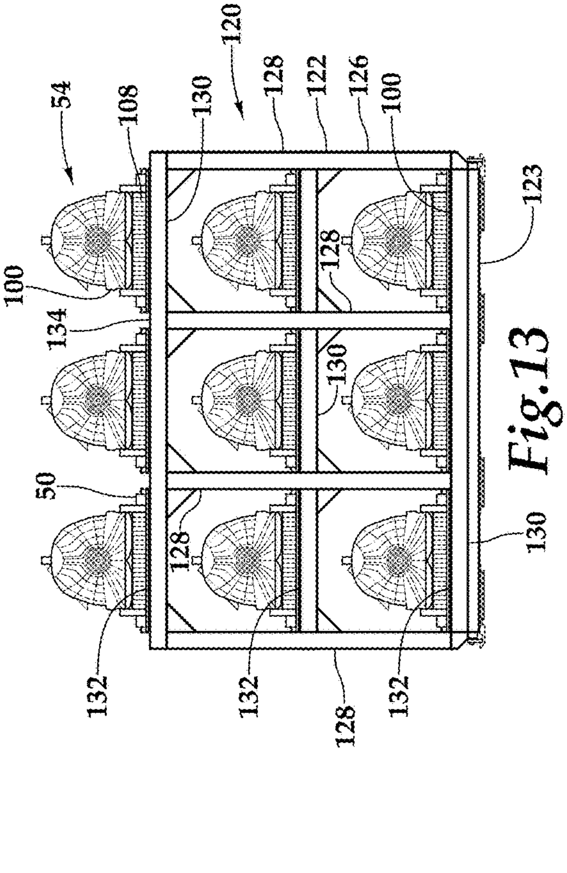
FIG. 13 is a front elevational view of a forward rack part of an alternative embodiment air drop deployment structure of this invention configured for cruise missiles.

A spring opening 114 extends upwardly through the crushable member 108 and is located between a flight direction midpoint of the elongated platform 102 and the first end 104. A helical coil spring 116 is disposed within the spring opening 114 and extends between the elongated platform 102 and an overlying pusher cap 118. The spring serves to apply an upward force when a missile is overlying the crushable member. When a cruise missile 54 is supported on skidboard 52 within a rack, the spring applies an upward force through the pusher cap 118 on the cruise missile. However, the spring force is not sufficient to lift the cruise missile from the crushable member. When a missile supported on the skidboard 100 is launched from the cargo aircraft, as shown in FIG. 13, the spring acts to separate the skidboard from the missile permitting the skidboard to fall away from and below the missile. The nose ballast 112 results in the skidboard 100 tipping downward such that the loose skidboard clears the cruise missile avoiding interference with its activation. The configuration of the skidboard

100 causes it to fall downwardly and thus take it out of a place of conflict with the cruise missile riding on it or with other cruise missiles launched at the same time. The ballast weight is thus arranged to cause the skid board to have a high ballistic cross-section so as to fall more rapidly than the payload missile such that the skid board cannot reengage the payload.

Figure 15:
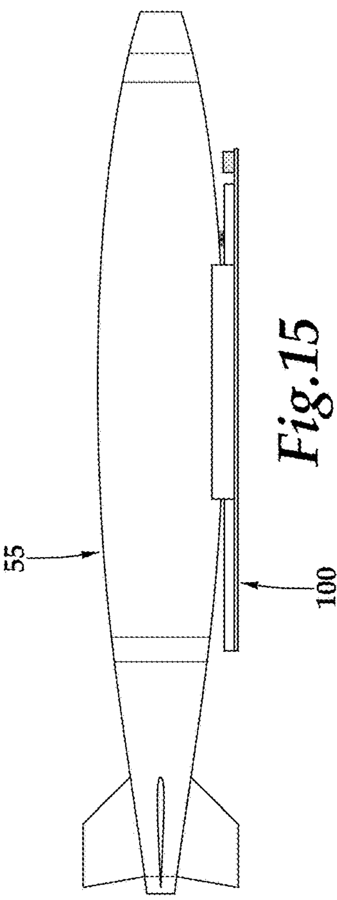
FIG. 15 is a side elevational view of a bomb mounted to the support board of FIG. 10.

The skidboard 100 may also be used to support a bomb 55, shown without restraint cables in FIG. 15. The deployment is the same as for the cruise missile as described above.

Figure 14:
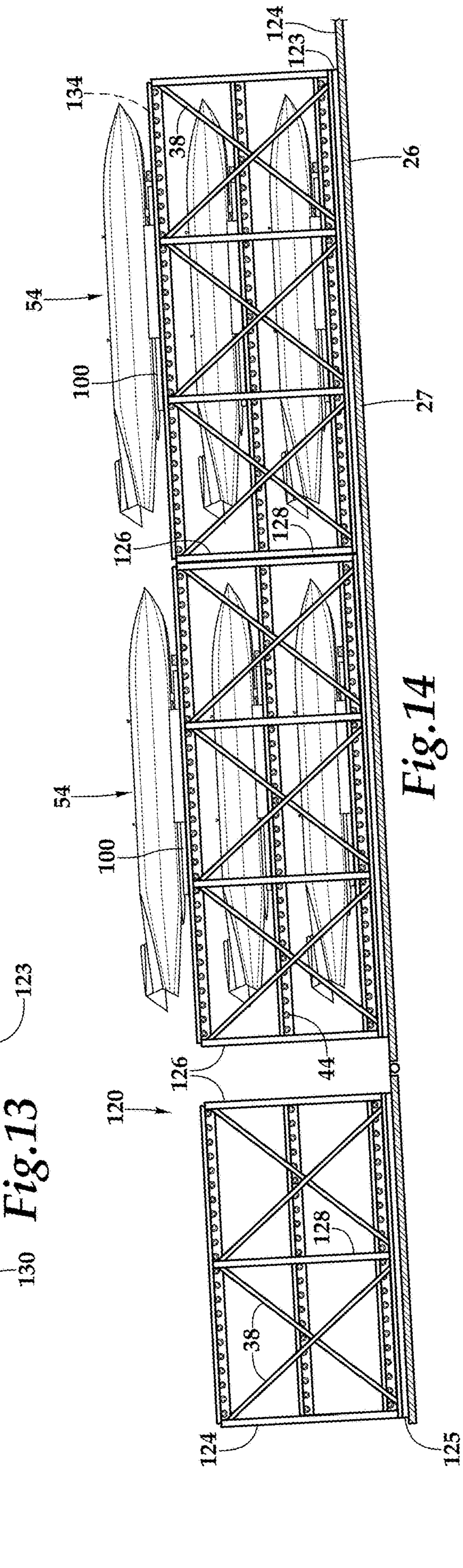
FIG. 14 is a schematic side elevational view of the air drop deployment structure of FIG. 13 mounted within a cargo aircraft in a deployment configuration.

An alternative embodiment air drop deployment rack assembly 120 is shown in FIGS. 13-14 which carries three levels of three abreast cruise missiles 54 or bombs. The rack assembly 120 has a rack forward part 122 having a forward platform 123 mounted to the load deck 24 and a rack aft part 124 having an aft platform 125 mounted to the cargo ramp 28 of the cargo aircraft 26. The construction of the rack assembly 120 is similar to the rack assembly 20, but the rectangular frame elements 126, as shown in FIG. 13, have three vertical members 128 and horizontal members 130 are provided to define three vertically spaced shelves 132 including a third shelf 134. The rectangular frame elements 126 are braced with tension members 38. Three pairs of roller assemblies 44 are mounted between the rectangular frame elements 126 with C-channels 48 on either side to define three front-to-aft channels 50 to receive a skidboard 100 which supports a cruise missile 54 or bomb. The restraints for the cruise missiles 54 are not shown in FIG. 14.

It should be noted that airdrop rack assemblies may have more or fewer side-by-side placements of payloads to be airdropped and different numbers of layers depending on the size of the payloads to be launched and the volume available within the cargo aircraft. Moreover, although specific drones and cruise missiles have been illustrated, the airdrop rack assemblies may be used to deploy many types of vehicles such as but not limited to cruise missiles, bombs, gliders, and powered gliders including jet augmented gliders. The term drone includes Uncrewed Aerial System (UAS) or Uncrewed Aerial Vehicle (UAV).

It is understood that the invention is not limited to the particular construction and arrangement of parts herein illustrated and described, but embraces all such modified forms thereof as come within the scope of the following claims.

We claim:

1. A skidboard for air drop of a cruise missile or bomb from a cargo aircraft, the skidboard comprising:

an elongated platform extending from a first end to a second end in a flight direction;

a crushable member overlying and fixed to the elongated platform;

two lateral restraints extending upwardly from the elongated platform and spaced from each other in a cross direction which is perpendicular to the flight direction, the lateral restraints positioned to restrain lateral displacement of a missile when disposed on the crushable member;

a nose ballast fixed to the first end of the elongated platform such that the center of gravity of the skidboard is closer to the first end than to the second end;

a spring opening in the crushable member located between a midpoint of the elongated platform and the first end; and a spring disposed within the spring opening to apply an upward force when a missile is overlying the crushable member, such that when a cruise missile or bomb supported on the skidboard is launched from an aircraft the spring acts to separate the skidboard from the missile permitting the skidboard to fall away from the cruise missile or bomb.

2. The skidboard of claim 1 wherein the crushable member comprises a structure of honeycomb paper.

3. The skidboard of claim 1 wherein the spring comprises a helical coil disposed within the spring opening, the helical coil extending between the elongated platform and an overlying pusher cap.

4. The skidboard of claim 1 wherein the nose ballast has a weight of at least 60 pounds.

5. The skidboard of claim 1 wherein the elongated platform extends in the cross direction sidewardly beyond each of the two lateral restraints to define flanges for engagement within C-channels of an airdrop rack.

* * * * *